R. LIEBAU.
VEHICLE AIR SPRING.
APPLICATION FILED MAY 13, 1913.
1,128,014.
Patented Feb. 9, 1915.
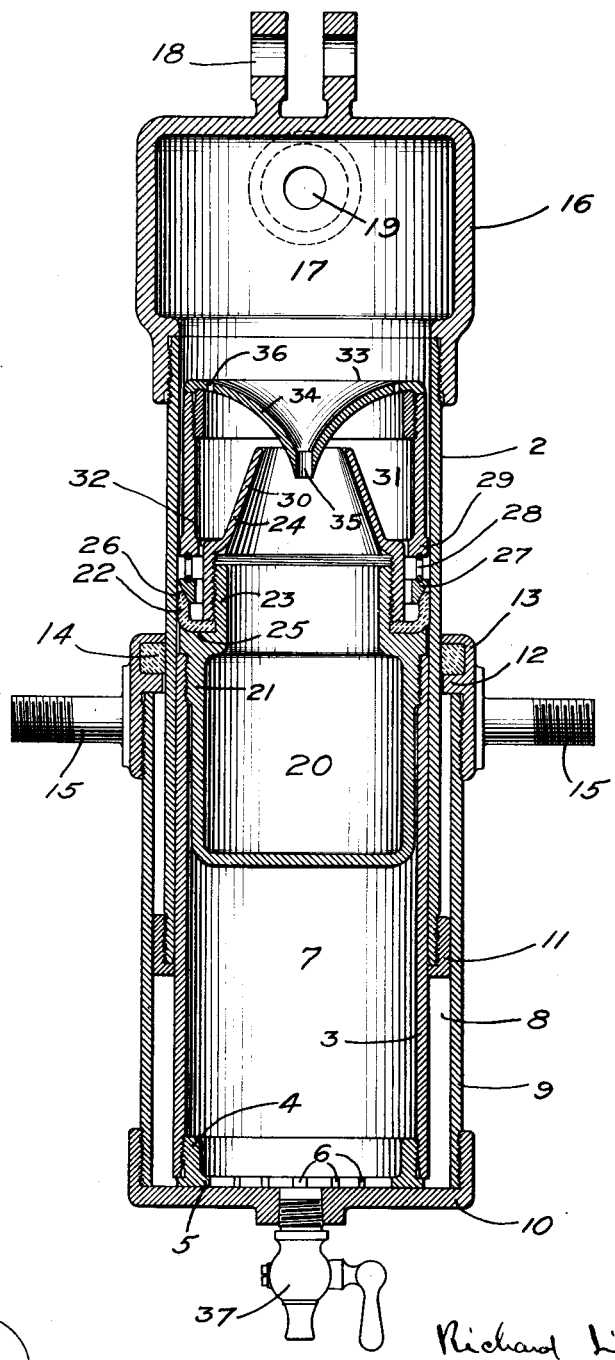
INVENTOR.
Richard Liebau
HIS ATTORNEY IN FACT
WITNESSES:

UNITED STATES PATENT OFFICE.

RICHARD LIEBAU, OF SWISSVALE, PENNSYLVANIA, ASSIGNOR TO THE WESTINGHOUSE AIR SPRING COMPANY, A CORPORATION OF PENNSYLVANIA.

VEHICLE AIR-SPRING.

1,128,014.      Specification of Letters Patent.      Patented Feb. 9, 1915.

Application filed May 13, 1913. Serial No. 767,313.

*To all whom it may concern:*

Be it known that I, RICHARD LIEBAU, a citizen of the United States, and a resident of Swissvale, in the county of Allegheny and State of Pennsylvania, have made a new and useful Invention in Vehicle Air-Springs, of which the following is a specification.

This invention relates to elastic fluid cushion devices and more particularly to such devices for use in connection with the spring suspension of vehicles such as automobiles, delivery wagons, trucks, etc.

One of the objects of this invention is to provide a relatively cheap and simple cushion device (hereinafter referred to as an air spring) for use where the initial cost is of consideration.

In a number of applications filed by George Westinghouse and in a number filed by me which embodied relatively movable members forming a closed chamber having a sliding joint and employing a sealing liquid, a pump is utilized for returning the sealing liquid which leaks past the sliding joint to the interior of the device. While these devices are self-maintaining, the initial cost is relatively high and for certain classes of work so high as to be prohibitive.

The present invention has for an object the production of a spring which will be self-maintaining to a certain extent, but in which the sealing liquid must from time to time be replenished; that is, the sealing liquid which leaks past the sliding joint must be replenished manually from time to time.

In the single sheet of drawing accompanying this application and forming a part of the same, I have illustrated in sectional elevation an air spring embodying this invention and the spring consists of an outer cylinder 2 within which a cylinder 3 is arranged to telescope. Cylinder 3 is provided with an end member 4, the bottom 5 of which is provided with openings 6 extending laterally therethrough so as to place the lower inner chamber 7 of cylinder 3 in communication with a space 8 formed between the outside of cylinder 3 and an outer guard cylinder 9 which is provided with a bottom member 10 externally threaded thereto and in contact with which bottom 5 rests. Threaded to the bottom end of outer cylinder 2 is a retainer ring 11 which when the air spring is fully extended will abut against a flange 12 of a retainer member 13 threaded to the upper outer end of guard cylinder 9. A felt wiper ring 14 retained in place by means of the flange 12 acts as a wiper along the exterior of cylinder 2. Retainer member 13 is provided with trunnions 15 which are adapted to be connected to the running gear or spring suspension upon which the air spring is to be used. Cylinder 2 is provided with a head member 16 which forms an air chamber 17 which is adapted to be pivotally or otherwise connected to the chassis or frame of the vehicle by means of a connecting member 18. A filling opening 19 in the head member will be provided with a valve, not shown, whereby suitable sealing liquid may be fed into the interior of the device and through which also the air for proper inflation may be introduced. An oil reservoir 20 formed by means of a member 21 which is threaded into the upper end of cylinder 3, is adapted to contain sealing liquid such as oil for supplying the cup leather packing 22 with the necessary oil to keep the same under a substantially constant head. Member 21 is slightly constricted by means of a flange 23 which is externally threaded to receive a retaining member 24.

Resting on the seat 25 formed on member 21 is the cup leather packing 22 which is held in place on the seat by means of the retainer member 24. The outer or free edge 26 of the cup leather packing is held in yielding contact with the inner surface of cylinder 2 by means of cone expander ring 27 spring pressed toward the cup leather packing by means of a spring 28 which lies between the top of the cone expander and the bottom of a flange 29 formed on the retainer 24. Retainer 24 is provided with a conical shaped flange 30 which forms a reservoir space 31 above the cup leather packing and which feeds oil to the cup leather packing through the channels 32. A cap deflector 33, provided with an inwardly and downwardly curved flange 34, provided with a central opening 35 and vent holes 36, tends to throw or direct the oil leaving reservoir 20 (due to its inertia when the air spring is being rapidly extended and compressed) into reservoir 31 above the cup leather packing. Any oil which leaks past the cup leather packing will flow down between the inner surface of cylinder 2 and the outer surface of cylinder 3 and will lubricate said surfaces in its passages to the oil collecting space 8 from whence it will flow into collecting chamber 7 through channels 6 in the bottom member. A drain cock 37 is provided for chamber 7 and at convenient intervals the oil collected in chamber 7 may be drained and an equivalent amount added through opening 19 to the interior of the device. When the air spring is placed in commission, suitable oil will be introduced into the device in sufficient quantity to cover the top of conical deflector 30.

In accordance with the provisions of the patent statutes, I have described the principle of operation of my invention together with the device which I now consider to represent the best embodiment thereof, but I desire to have it understood that the device shown is only illustrative and that the device can be carried out in other ways.

Having thus described my invention, what I claim is:

1. An air spring comprising telescopically arranged members having a sliding joint therebetween and forming a closed chamber, a packing for the sliding joint, a reservoir for supplying said packing with sealing liquid, sealing liquid within said device, and a deflector for directing sealing liquid into said reservoir.

2. An air spring comprising movable members forming a closed chamber having a sliding joint, a packing for said joint, a reservoir for sealing liquid above said packing and in communication with said packing, a reservoir for sealing liquid below said packing, and means for deflecting sealing liquid from said lower reservoir to said upper reservoir upon movement of the air spring in use.

3. An air spring comprising telescopically arranged movable members having a sliding joint therebetween and forming a closed chamber, a packing for said joint, a reservoir above said packing and in communication therewith for delivering sealing liquid thereto, and a reservoir for sealing liquid below said first mentioned reservoir and in overflowing communication therewith from which fluid is adapted to be slopped into said first mentioned reservoir.

4. An air spring comprising telescopically arranged movable members having a sliding joint therebetween, a packing for said joint, a reservoir above said packing and in communication therewith for delivering sealing liquid thereto, and a second reservoir movable with one of said members and in overflowing communication with said first reservoir.

5. An air spring comprising movable members forming a closed chamber and having a sliding joint, a packing for said joint, a reservoir for sealing liquid located above said packing, and communicating therewith by means of restricted passages, a second reservoir located in overflowing or slopping communication therewith and a deflector for deflecting liquid slopped from said second reservoir to said first reservoir.

6. An air spring comprising telescopically arranged members having a sliding joint therebetween and forming an inclosed chamber, a packing for said joint, a reservoir for sealing liquid in restricted communication with said packing, a second reservoir for sealing liquid, movable with the running gear of the vehicle and in slopping communication with said first mentioned reservoir.

7. An air spring comprising movable members, located in telescopic relation, forming a closed chamber, and having a sliding joint therebetween, one of said members being adapted to be secured to the running gear and the other to the body of a vehicle, a packing for said sliding joint located within the chamber formed by said members, and a reservoir located within the chamber, movable with the running gear of the vehicle, and located in slopping communication with the packing.

8. An air spring for vehicles, comprising telescoping members having a sliding joint therebetween, and forming an inclosed chamber of variable volumetric capacity, a packing for said sliding joint, a reservoir for sealing liquid located in overflowing or slopping communication with said packing and within said chamber, and a leakage chamber below said reservoir for receiving the liquid leaking past said packing.

In testimony whereof, I have hereunto subscribed my name this 8th day of May, 1913.

RICHARD LIEBAU.

Witnesses:
C. W. McGHEE,
ANNA CLOHERTY.